Figure 1:
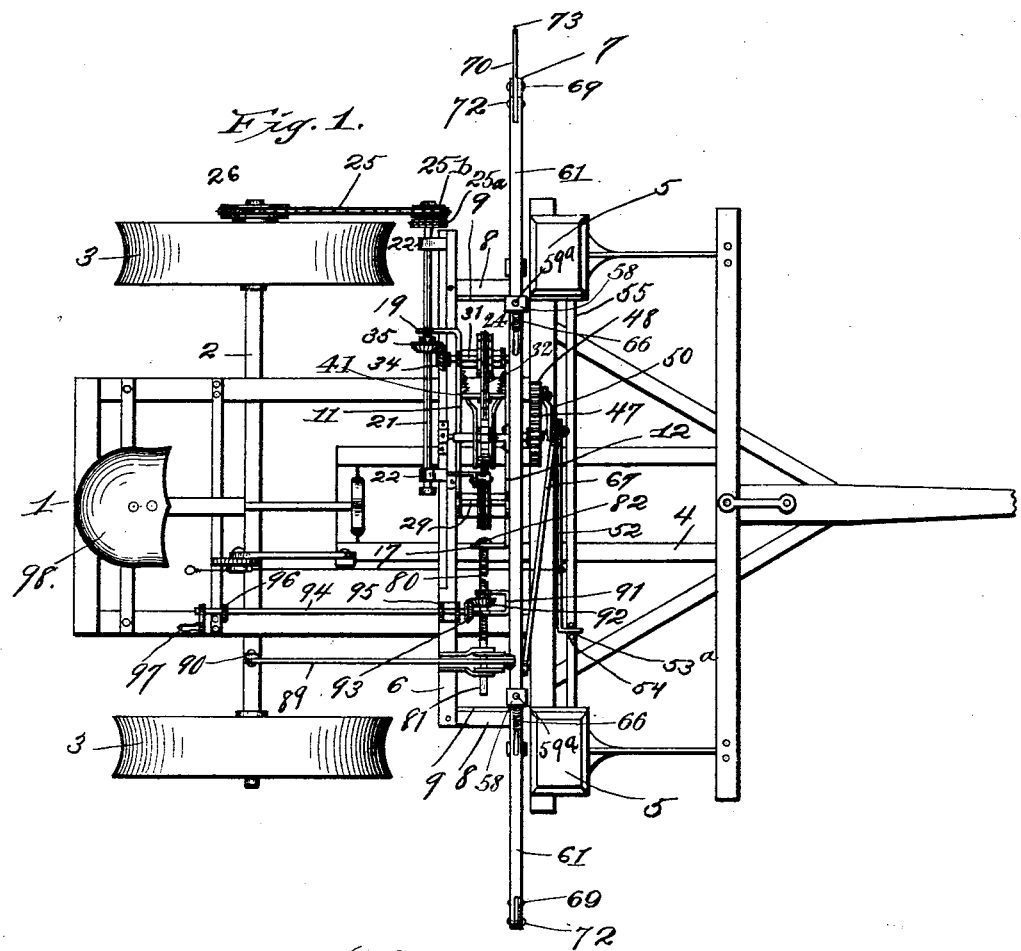

(No Model.)  2 Sheets—Sheet 1.

W. J. TAYLOR.
WIRELESS CHECK ROW ATTACHMENT FOR CORN PLANTERS.

No. 514,518. Patented Feb. 13, 1894.

Witnesses
M. P. Smith
G. L. Thorpe

Inventor:—
W. J. Taylor:—
By Higdon & Higdon
Attys (No Model.) 2 Sheets—Sheet 2.
W. J. TAYLOR.
WIRELESS CHECK ROW ATTACHMENT FOR CORN PLANTERS.
No. 514,518. Patented Feb. 13, 1894.
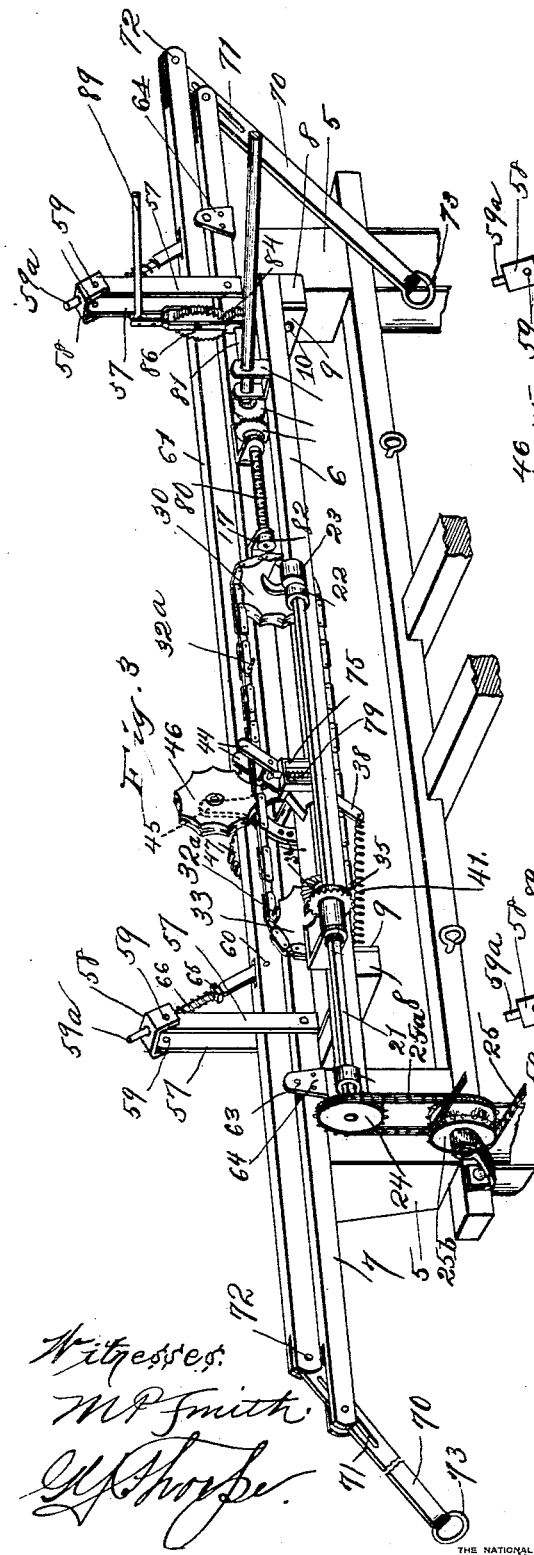
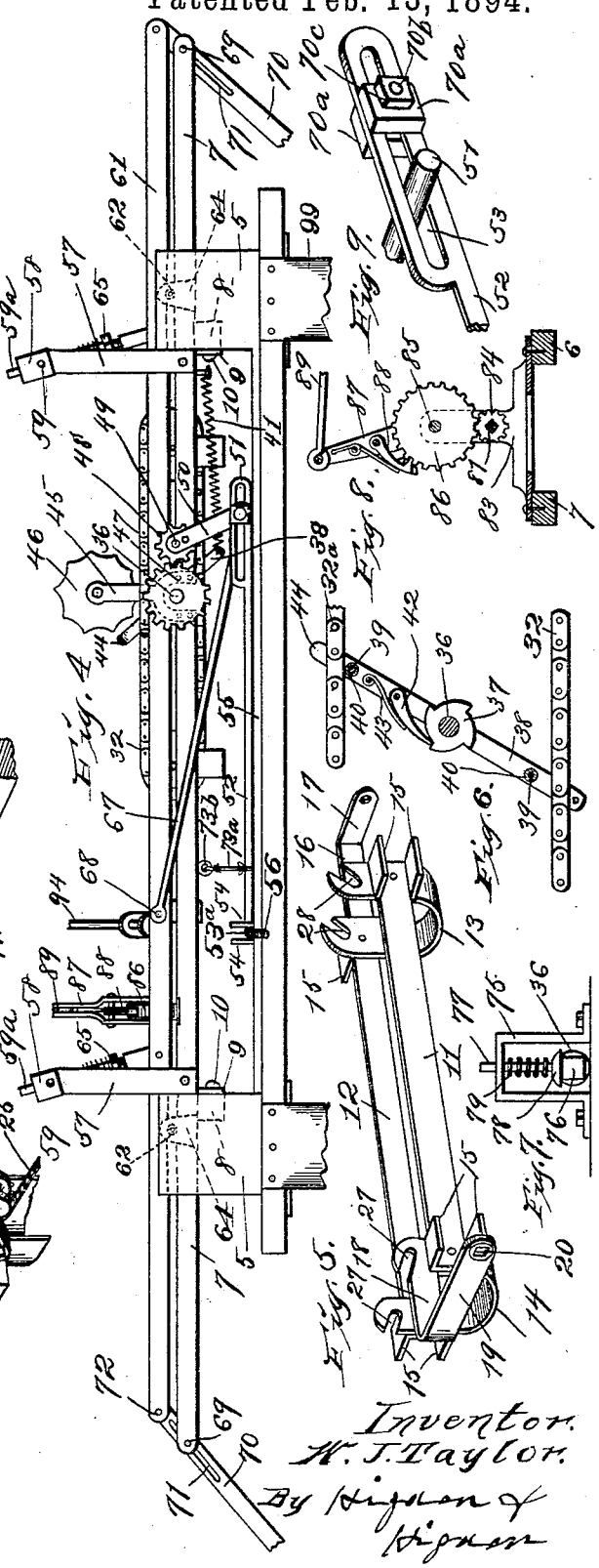
Witnesses:
M. P. Smith
Inventor.
W. J. Taylor.
By Higdon & Higdon
Att'ys

UNITED STATES PATENT OFFICE.

WILLIAM J. TAYLOR, OF ALDRICH, MISSOURI.

WIRELESS CHECK-ROW ATTACHMENT FOR CORN-PLANTERS.

SPECIFICATION forming part of Letters Patent No. 514,518, dated February 13, 1894.

Application filed August 21, 1893. Serial No. 483,613. (No model.)

*To all whom it may concern:*

Be it known that I, WILLIAM J. TAYLOR, of Aldrich, Polk county, Missouri, have invented certain new and useful Improvements in Check-Row Attachments for Corn-Planters, of which the following is a full, clear, and exact description, reference being had to the accompanying drawings, forming a part hereof.

My invention relates to improvements in that class of check-row corn planters, wherein the seed-dropping and marking mechanism is operated simultaneously and through the action of one of the drive wheels, and has for its objects, first, to produce a check-row attachment which may be easily and conveniently attached to corn-planters of the ordinary construction having a reciprocatory seed-slide; secondly, to produce an automatic take-up for lost motion to insure the dropping of the seed at regular distances apart; and thirdly, means to reset or readjust the take-up mechanism after the take-up is exhausted or has reached its limit of movement in that direction.

My invention consists essentially, in the combination with a traveling frame carrying a pair of sprocket-wheels connected by an endless chain, having at suitable intervals dropping links, and intermediate mechanism connecting one of the drive-wheels with the shaft of one of said sprocket wheels, an intermittently movable shaft connected operatively to the seed-slide and the markers, and having a ratchet-wheel, and a pivoted lever or frame having a pawl engaging said ratchet, and adapted through the medium of said ratchet, when pivotally operated by the successively presented dropping-links to operate the seed-slide and the markers; of an automatic take-up device comprising a worm-rod operatively connected to the traveling-frame and having a pawl and ratchet mechanism operatively connected to the axle of the corn planter proper, in such manner that as the machine is raised or lowered in passing over rough or uneven ground, such motion is communicated to and actuates the worm to move the traveling frame, so that the approaching dropping-link will be adjusted relatively to the lever or frame in a proportionate degree; and also in a pinion having a threaded passage and mounted upon the worm-rod, and operatively connected to a crank handle by which the driver, rotating the worm in the opposite direction, may return the traveling frame to its original position or starting point.

With the above mentioned objects in view, my invention further consists in certain peculiar and novel features of construction and combinations of parts as will hereinafter appear and be pointed out in the claims.

Figure 2:
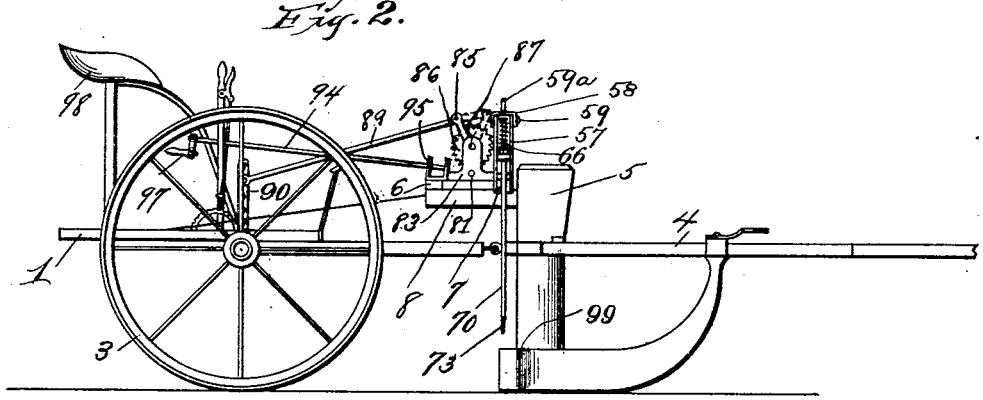

Referring to the drawings which accompany and illustrate this invention,—Figure 1, represents a plan view of a corn planter of the ordinary construction, and showing connected thereto in operative position my improved check-row attachment. Fig. 2, is a side elevation of the same. Fig. 3, is a detail perspective view on an enlarged scale of a portion of a corn-planter as viewed toward the rear side of the hoppers or corn receptacles, and showing my improved attachment applied thereto in operative position. Fig. 4, is a front view of the same. Fig. 5, is a detail perspective view of the traveling frame of my attachment. Fig. 6, is a vertical sectional view of the intermittently movable shaft, and showing thereon the lever and a part of the endless chain. Fig. 7, is a view in detail of the spring-actuated stop for limiting the revoluble movement of the intermittently movable shaft. Fig. 8, is a sectional view of the frame-work of said attachment, and showing also in section the worm-shaft or rod and the pawl and ratchet mechanism for operating said worm shaft. Fig. 9, is a detail perspective view of the slotted end of the pitman which is connected to the seed-slide, and showing applied thereto in operative position the adjustment-block to regulate the travel of the crank-pin, and thereby increase or diminish at will the throw or movement of the seed-slide.

In the said drawings, 1 designates the rear portion of the frame-work of a corn planter of ordinary construction; this frame-work being mounted in the usual manner upon the axle 2 which carries the drive wheels 3.

4 designates the front portion of the frame-work, and 5 the hoppers or corn-receptacles carried by said front portion of the frame-work, and in the usual manner.

An elongated rectangular frame consists of the parallel bars 6 and 7, the front bar 7 being considerably longer than the rear bar 6, and the transverse short bars 8—8 uniting the bars 6 and 7. The bars 8 are bolted or otherwise secured to the under side of the bars 6 and 7 so that the metal bars 9 secured to the inner sides of said bars 8 shall project forward beyond the bar 7 and be secured at the inner sides of the hoppers or seed-receptacles 5, by bolts 10, or by other suitable means.

A traveling frame consists of the metal bars 11 and 12 which are arranged parallel and are connected near their opposite ends by the depending and U-shaped brackets 13 and 14. This frame is arranged so that the bars 11 and 12 shall rest against the inner sides of the bars 6 and 7 respectively, and in order to support the frame in this position, the said bars are provided near each end and at their upper and lower margins with the outwardly projecting flanges 15 which engage against the upper and lower edges of the bars 6 and 7. The front bar 12 at its inner end is longitudinally extended at 16 and said extension 16 is provided with the rearwardly projecting arm 17 formed with an opening in its outer end, for a purpose to be hereinafter explained. The vertical arm of the U-shaped bracket 14 which is secured to the outer end of the bar 11, is formed with a horizontal arm 18 extending in the same direction as the bar 11, that is, transversely of the machine, and this extension 18 is formed at its outer end with an arm 19, which projects rearward and longitudinally of the machine, and is provided with a circular opening in its outer end, in which is revolubly mounted a circular bearing-box having a squared opening 20, (see Fig. 5) through which passes the horizontal and transversely arranged squared shaft 21, which is journaled or revolubly supported in bearing brackets 22 carried by the bar 6 of the attachment. The inner end of the shaft is formed with an enlargement or collar 23, and mounted upon the outer end of said shaft is a sprocket-pinion 24.

A double idler sprocket 25ᵇ is revolubly supported in a bearing carried by the framework of the planter, and this sprocket is connected through the medium of the chains 25 and 25ᵃ, with the sprockets 26 and 24 respectively; said sprocket wheel 26 being mounted upon or secured to one of the drive-wheels 3 of the machine. The vertical arms of the U-shaped brackets 13 and 14 project a suitable distance above the bars 11 and 12, and the upwardly and outwardly inclined notches or recesses 27 are formed in the ends of the bracket 14, and the upwardly and inwardly inclined notches or recesses 28 are formed in the ends of the bracket 13; the grooves or recesses of the brackets 13 and 14 extending divergently upward. Revolubly mounted in the notches or recesses 27 is a shaft 31, and mounted rigidly upon said shaft is the sprocket 30. A similar shaft is mounted in the notches or recesses 28, and operatively connected by the chain 32, to the sprocket wheel 30, of said shaft. It is to be understood that bearings of any ordinary or suitable kind may be formed in or carried by the arms of the U-shaped brackets for the reception of the said shafts. The shaft 31 extends rearwardly a suitable distance, and mounted rigidly upon said shaft is a gear pinion 34 which meshes with the gear pinion 35 mounted to revolve with and slide upon the shaft 21.

Extending longitudinally of the machine and journaled in bearings upon the bars 6 and 7, and located between the sprocket wheels 30 and 33 is a shaft 36, and mounted rigidly upon the shaft and in alignment with the sprockets 30 and 33 is a ratchet pinion 37 which is provided with four teeth arranged at regular or equal distances apart, and the disposition of these teeth is inward or toward the sprocket wheel 30. A lever or frame is pivotally mounted upon the shaft 36, and consists of the similar arms 38, one of these arms being arranged at each side or face of the ratchet wheel 37, and these arms are united a suitable distance each side of their center by the cylindrical cross rods 39, or anti-friction rollers 40 may be mounted loosely upon these rods as shown. Secured to the lower end of each bar 38 is a retraction spring 41, and these springs 41 are secured at their opposite and outer ends to bolts or studs projecting from the stationary portion of the frame-work. It will be seen that these retraction-springs normally hold the pivotal lever or frame in an upwardly and inwardly inclined position. Pivotally mounted upon a cross-rod connecting the bars 38 of said lever or frame is a pawl 42, and actuating said pawl to engage the teeth of the ratchet 37 is a spring 43 which is also carried by said pivotal lever or frame. The bars 38 comprising the pivotal lever or frame, are of sufficient length to project a suitable distance above and at opposite sides of the endless chain 32, and have their upper ends rounded at 44 for a purpose to be hereinafter explained, and bolted or secured in any suitable manner to the bar 6 of the framework is the vertical and upwardly extending bracket 45 which is arranged a suitable distance inward of the pivotal lever or frame and carries an idler or guide sprocket 46 which is adapted to bear upon the upper side of the chain 32 and hold it down to its work.

The chain 32 is provided at suitable intervals with "dropping-links," that is, certain links are provided with outwardly projecting pins or studs 32ᵃ, which are adapted as the chain moves outwardly or from right to left to successively contact with the upper portions of and pivotally operate the lever or frame until the said pins ride over the rounded upper ends of the said lever or frame and allow the springs to return it to its original position. It will be observed that the lever is of such length that the pivotal operation caused by the dropping-links is just sufficient to rotate the intermittently movable shaft a quarter of a circle. By bending the lower portions of the bars 38 outwardly as shown, it will be seen that the inwardly moving dropping-links of the lower portion of the chain do not contact with, but pass between said bars. It will be seen further, that the tendency of the pivotal lever, owing to the upper anti-friction roller 40 bearing against the under side of the chain, is to raise said chain as said lever approaches a vertical position, and that by providing the guide-sprocket 46 pressing upon the upper side thereof, the chain is held between the bars of the lever or frame, and into frictional contact with the roller 40, and also that this pivotal operation of the lever or frame, and the tensioning thereof by the roller 46 causes the chain to frictionally engage the anti-friction roller 40 carried by the lower portion of the said lever or frame.

The intermittently movable shaft 36 projects forwardly and carries rigidly upon its front end and at the outer side of the bar 7, a gear wheel 47, and meshing with this gear wheel 47 is a gear pinion 48 which is mounted upon a stub-shaft 49 carried by the bar 7. Embracing said stub-shaft and rigidly carried by the gear pinion 48 is the crank arm 50, and this crank arm is provided at its outer end with an outwardly projecting crank pin 51 which engages and is adapted to operate in the slot 53 of a pitman 52.

An adjustment block is mounted in the slot 53 of the pitman 52, and consists of a pair of blocks or plates 70$^a$ fitting against opposite sides of the slot, and a bolt 70$^b$ passing through the slot and blocks and engaged by a nut 70$^c$ at one end, so that the blocks may be clamped at any desired point of adjustment to limit the travel of the pitman in the said slot.

The pitman 52 extends inwardly or to the right and parallel with the bar 7, and is formed at its free end with the forwardly projecting and horizontal arm 53$^a$ which fits between the upwardly extending pins 54 of the seed-slide bar 55, and the arm 53$^a$ is formed with the downward extension 56 at its outer end which fits against the front side of said seed slide, and tends to hold the pitman rod in position. In order to disengage the pitman from the seed-slide at any time desired, a cord or other flexible connection 73$^a$ is secured to the pitman adjacent to its point of connection with the seed-slide, and is then passed upwardly and through the ring or loop 73$^b$ carried by the bar 7, and then rearwardly toward the driver where it may be detachably connected to the framework adjacent to the seat.

Bolted or otherwise secured to opposite sides of the bars 7 adjacent to the hoppers 5 are the vertical and upwardly projecting standards 57, and these standards 57 are united at their upper ends by the inverted U-shaped brackets 58 which are pivotally mounted at 59 to the upper ends of said standards, and the bridge-portions of said brackets 58 are provided with holes or apertures through which the upper ends of cylindrical rods 59$^a$ project. These rods 59$^a$ extend downwardly and are pivotally connected at 60 to the reciprocatory bar 61 which extending between the guide-standards 57 rests upon the anti-friction rollers 62 mounted revolubly on cross-pins 63 carried by brackets 64 secured to the stationary bar 7. These pivotal rods 59$^a$ are formed with shoulders or enlargements a suitable distance from their pivotal points, and the cylindrical portion of each rod 59$^a$ adjacent to said shoulders is screw-threaded to receive a nut 65. A spiral spring 66 encircles the cylindrical portion of each rod 59$^a$ and bears at its opposite ends against the nut 65 and the under side of the bridge-portion of the pivotal bracket 58. It will thus be seen that by operating the nut 65 properly the tension of the spring 66 may be increased or diminished at will, so as to exert a corresponding pressure upon the reciprocatory bar 61. A pitman rod or bar 67 is pivotally mounted at its opposite ends upon the crank-pin 51, and upon the pin or bolt 68 carried by the bar 61.

Pivotally mounted at 69 in the bifurcated outer ends of the bar 7 are the marker bars or levers 70, said marker bars being formed with the longitudinally extending slot 71 to operate upon the pivots 69 for a purpose to be hereinafter explained. The upper ends of said marker bars are pivotally mounted at 72 in the bifurcated outer ends of the reciprocatory bar 61, and said bars extend downwardly and parallel and carry marker rings 73 at their lower ends; said rings being preferably circular in cross section so as to afford the least resistance to the operation of the arms, and at the same time to make a distinct and perceptible mark upon the ground.

It will be seen from the foregoing, that the reciprocatory action of the bar 61 will cause the marker bars or levers 70 to be pivotally operated to engage upon or into the ground, and that by reason of the longitudinal slots 71, said bars will adapt themselves to unevenness in the surface of the ground, by riding upwardly upon the pivots 69, and at the same time the spring pressed bar 61 will yield sufficiently to allow this action to take place, and the pivotal brackets will adapt themselves to the inclination of the rods 59$^a$.

In order to absolutely prevent the shaft 36 from turning more than ninety degrees or a quarter of a circle at each intermittent movement, or a distance corresponding to the distance between the teeth of the ratchet wheel 37, I bolt or otherwise secure an inverted U-shaped bracket 75 upon the bar 6; this bracket inclosing the squared end 76 of the shaft 36. The bridge or horizontal portion of this bracket is provided with a guide opening through which extends the cylindrical rod 77 which carries upon its lower end the seat or plate 78, and spirally encircling said stem and bearing at its opposite ends against the seat or plate 78 and the under side of the bridge or horizontal portion of the bracket is a spring 79 which continuously exerts a firm but yielding pressure upon the squared portion 76 of the shaft, so that as the shaft is turned as hereinafter referred to, the plate or seat 78 will be raised or elevated, and as soon as the force which overcomes the resistance of the spring 79 is spent, which is when the shaft has turned a quarter of a revolution, the spring 79 exerting its downward pressure causes the seat or plate 78 to impinge and bear firmly upon the succeedingly presented side of the squared portion 76 of the shaft, and therefore prevents any further movement of the shaft until the spring again yields under the pressure of an overcoming force.

Arranged horizontally and extending transversely of the machine, and loosely journaled near its opposite ends in the opening or hole in the arm 17 of the traveling frame, and in a bearing bracket secured to the bars 6 and 7 is a shaft consisting of a worm-threaded portion 80 and a squared portion 81; the worm threaded portion being journaled in the arm 17 of the traveling frame, and the squared portion being supported in the bracket referred to. This worm shaft is formed with a left handed thread for a purpose which will hereinafter appear, and is also provided with a head or collar 82 at its end which bears against the inner side of the arm 17 of the traveling frame. The supporting bracket for the squared portion of the shaft consists of a pair of arms 83 which are united at their lower ends and extend vertically upward a suitable distance, and loosely mounted upon and adapted to revolve with the squared portion 81 of the shaft is a pinion 84 which is held from lateral movement by the plates 83 of the bearing bracket. A short shaft or cross rod 85 connects the upper ends of the plates 83, and mounted loosely upon said rod or shaft is a ratchet wheel 86 which meshes with the pinion 84. A lever consisting of a pair of similar bars 87, one arranged upon each side of the ratchet wheel 86 is pivotally mounted at its lower end upon the shaft or rod 85, and this lever also carries a number of pawls 88 one of which is always in engagement with said ratchet. These pawls may be spring-actuated as shown, or they may be gravity pawls, and the object in having a plural number of said pawls is to insure an extremely fine adjustment of the traveling frame, so that when the worm moves, no matter how slightly, one of said pawls will always be in engagement with the ratchet to prevent any back motion thereof. A rod 89 is also pivotally connected at its opposite ends to the upper end of said lever and to a bar 90 provided with a series of holes, which is pivotally secured to the axle 2 of the planter, and in longitudinal alignment with the said lever. By providing the bar with a series of holes so that the rod 89 may be adjusted toward or from the axle, the leverage can be diminished or decreased so that the worm will be moved a little or a greater distance, as desired, or to accommodate machines of different construction. A U-shaped bracket 91 is bolted or otherwise rigidly secured to the bar 7 so that its horizontal and rearwardly projecting arms shall embrace the threaded portion 80 of the shaft, and a miter-gear 92 which is internally threaded is mounted upon the threaded portion of said shaft and between the rearwardly projecting arms of the bracket 91; this arrangement being to prevent lateral movement of the miter-gear when the worm shaft is operated as hereinafter explained.

A bevel-pinion 93, meshes with the bevel-pinion 92, and is mounted rigidly upon the front end of a shaft or rod 94, which is journaled near its front and rear ends, respectively, in the brackets 95 and 96, carried by the bar 6, and the framework of the machine. A crank-handle 97, is mounted upon the rear end of the shaft or rod 94, within convenient reach of the driver's seat.

In the operation of the device, motion is imparted to the endless chain 32 from the left-hand drive-wheel 3, through the medium of the sprocket-wheels 26 and 24, and the chains 25 and 25ª, the shaft 21, and beveled pinions 35 and 34. The motion is from right to left, and at regular intervals, the dropping-links will engage the upper end of the spring retracted pivotal lever or frame, and cause the spring-actuated pawl 42 to rotate the intermittently movable shaft a quarter of a revolution, when the spring-actuated stop-pin will engage one of the squared faces of the shaft and hold it securely, while at the same time the springs 41 will return the pivotal lever or frame to its original position. Simultaneously with the intermittent movement of the shaft 36, the gear-wheel thereon causes the operation of the crank-arm 50, which through the medium of the pitmen 67 and 52, causes the simultaneous reciprocation of the bar 61, and the seed-slide respectively, and therefore causes the marker-arms to pivotally swing and impress or mark the ground, and the dropping of the seed. As before stated, the marker carrying bar 61, is held down with a yielding pressure, so that should the marker-rings strike an obstruction, or come violently in contact with the ground owing to the unevenness or other cause, the bar 61 will yield and allow the arm to ride safely over the obstruction or roughened surface. It will be seen also, that by adjusting the block in the slot 53 of the pitman 52, the throw of the seed-slide and the markers may be adjusted to the length desired, and when it is desirable or necessary by pulling upon the cord or flexible connection, the pitman 52 may be disengaged entirely from the seed-slide.

When the machine is passing over smooth ground the automatic take-up device is inoperative, but when the runners 99 of the planter ride up an inclined or uneven surface the rod 89 causes the lever 87 to pivotally operate forwardly, as shown in dotted lines Fig. 2, and the spring-actuated or gravity pawl if desired, 88, takes a new grip upon the ratchet-wheel 86. As soon as the runners reach the top of said inclined surface, or as they descend upon the other side, if the irregular surface is only of slight width, the rod 89 exerts a pulling pressure in the direction of arrow Fig. 2, upon the upper end of the lever 87, and through the medium of the pawl 88, ratchet wheel 86, and pinion 84, mounted upon the squared portion of the worm-shaft, said shaft is caused to revolve, and being a left-hand thread, moves outwardly or toward the right. This movement, by reason of the connection therewith, causes the traveling frame to move in the same direction, and therefore causes the dropping-link, adapted next to contact with the pivotal lever or frame, to be moved away therefrom a distance proportionate to the throw of the lever 87, so that the said dropping-link will engage the lever later than when traveling upon a plane surface. After all the take-up is exhausted, by operating the crank-handle 97, the driver may rotate the pinion 92 and cause the worm-shaft to move the traveling-frame back to its original position.

From the above description, it will be seen that I have produced a check-row attachment which is simple, durable and comparatively inexpensive of construction, which may be easily attached to or detached from a corn-planter, which insures the simultaneous dropping of the seed and marking of the ground, and also automatically accommodates itself to any motion lost by passing over rough or uneven ground.

Having thus described my invention, what I claim as new, and desire to secure by Letters Patent, is—

1. In a corn planter, the combination with a check-row attachment, consisting of parallel bars, a traveling frame carried by and between said bars, sprocket wheel carrying shafts carried by said traveling frame, and a chain having dropping-links, and connecting the sprocket wheels of said shafts, and an intermittently movable shaft, and a seed-slide, and a marker carrying bar, and suitable mechanism connecting the intermittently movable shaft, and the seed-slide, and also connecting the said shaft with the marker carrying bar, of an automatic take-up mechanism which is operatively connected to the sliding frame and to the axle of the planter so that when the machine passes over rough or uneven ground, the slide-frame will be automatically operated to accommodate itself to any lost motion, substantially as set forth.

2. A corn planter, comprising a check-row attachment having a pair of parallel bars, a traveling frame carried by and between said parallel bars, sprocket carrying shafts carried by said traveling frame, and a chain connecting said sprocket wheels, and provided with dropping links at suitable intervals, and an intermittently movable shaft operatively connected to the seed-slide and the marker carrying bar of the planter, a ratchet mounted upon said shaft, and a lever pivoted also upon said shaft and carrying a spring actuated pawl engaging said ratchet, and adapted to be engaged by the dropping-links of the chain, and a take-up mechanism, comprising a left-hand worm shaft connected to the traveling frame, and having a squared portion, a pinion mounted upon said squared portion, and a ratchet wheel engaging said pinion, the pivotally mounted lever carrying a pawl engaging said ratchet, and a rod pivotally connecting said lever with the axle of the planter, substantially as set forth.

3. A corn planter, comprising a check-row attachment having a pair of parallel bars, a traveling frame carried by and between said parallel bars, sprocket carrying shafts carried by said traveling frame, and a chain connecting said sprocket wheels, and provided with dropping links at suitable intervals, and an intermittently movable shaft operatively connected to the seed-slide and the marker carrying bar of the planter, a ratchet mounted upon said shaft, and a lever pivoted also upon said shaft and carrying a spring actuated pawl engaging said ratchet, and adapted to be engaged by the dropping-links of the chain, and a take-up mechanism, comprising a left-hand worm shaft connected to the traveling frame, and having a squared portion, a pinion mounted upon said squared portion, and a ratchet wheel engaging said pinion, the pivotally mounted lever carrying a pawl engaging said ratchet, and a rod pivotally connecting said lever with the axle of the planter, and a miter-gear screw-threaded internally and engaging the worm shaft and a bracket to prevent any lateral movement of the miter-gear, and suitable mechanism connected to a handle near the driver whereby the worm may be operated after the take-up is exhausted to return the sliding frame to its original position or starting point, substantially as set forth.

4. The combination with a corn planter, of a check-row attachment, comprising a pair of parallel bars, a traveling frame carried by and between said bars, shafts carried by said traveling frame, and sprocket wheels carried by said shafts, and a chain connecting said sprocket wheels, and a miter-gear mounted upon one of said shafts, a squared shaft carried by one of said parallel bars, and embraced by an extension of the traveling frame, and a miter-gear mounted slidingly upon the squared shaft, and meshing with the first mentioned miter-gear, and arranged between said gear and the extension of the sliding frame embracing the squared shaft, and means to operate said shaft through the action of one of the drive wheels, and a take-up mechanism which as the machine rides over rough or uneven ground automatically moves the traveling frame and also moves the miter-gear carried upon the squared shaft, substantially as set forth.

5. In a corn planter, a roller carrying bar, standards carried by said bar, and a reciprocatory bar mounted upon said rollers and passing through said brackets, and brackets pivotally carried at the upper ends of the standards and having a hole or aperture in their horizontal or bridge portion, and rods pivotally connected to the reciprocatory bar and having their upper ends passing through said holes or apertures, and also formed with shoulders or enlargements a suitable distance from their pivotal ends, and springs spirally encircling said rods and bearing against their upper and lower ends against the under side of the pivotal brackets, and said shoulders or enlargements, and marker arms carrying rings at their lower ends and provided with longitudinally extending slots, which arms are pivotally connected to the roller carrying bar, and pivotally connected to the outer ends of said reciprocatory bar, substantially as set forth.

6. In a corn planter, a roller carrying bar, and brackets carried by said bar, and standards pivotally carried at the upper ends of the standards, and having holes or apertures in their bridge-portion, and marker-arms pivotally and self-adjustably mounted in the ends of the roller carrying bar, and also pivotally connected to the ends of the reciprocatory bar, and rods pivotally connected to the reciprocatory bar, and reduced to form cylindrical and screw threaded portions, the upper end of which passes through the holes or apertures of the pivotal bracket, and adjusting nuts mounted upon said screw-threaded portion, and springs spirally encircling the cylindrical portions of said rods, and bearing at their upper and lower ends against the under side of the pivotal brackets and the upper sides of said nuts, substantially as set forth.

In testimony whereof I affix my signature in the presence of two witnesses.

WILLIAM J. TAYLOR.

Witnesses:
ARTHUR GRIFFIN,
I. A. S. AARONS.